(12) United States Patent
Fukushima

(10) Patent No.: US 9,160,176 B2
(45) Date of Patent: Oct. 13, 2015

(54) WIRELESS POWER FEEDER, WIRELESS POWER RECEIVER, AND WIRELESS POWER TRANSMISSION SYSTEM

(75) Inventor: Noriyuki Fukushima, Tokyo (JP)

(73) Assignee: TDK Corporation, Tokyo (JP)

( * ) Notice: Subject to any disclaimer, the term of this patent is extended or adjusted under 35 U.S.C. 154(b) by 636 days.

(21) Appl. No.: 13/530,852

(22) Filed: Jun. 22, 2012

(65) Prior Publication Data

US 2012/0326522 A1    Dec. 27, 2012

Related U.S. Application Data

(60) Provisional application No. 61/499,892, filed on Jun. 22, 2011.

(51) Int. Cl.
  *H02J 5/00*  (2006.01)
  *H02J 7/02*  (2006.01)
  *H02G 3/00*  (2006.01)

(52) U.S. Cl.
  CPC  *H02J 5/005* (2013.01); *H02J 7/025* (2013.01)

(58) Field of Classification Search
  USPC .................................................. 307/9.1, 104
  See application file for complete search history.

(56) References Cited

U.S. PATENT DOCUMENTS

| | | | |
|---|---|---|---|
| 5,669,470 A * | 9/1997 | Ross | 191/10 |
| 8,008,888 B2 | 8/2011 | Oyobe et al. | |
| 8,178,995 B2 | 5/2012 | Amano et al. | |
| 2007/0182367 A1 | 8/2007 | Partovi | |
| 2008/0278264 A1 | 11/2008 | Karalis et al. | |
| 2009/0045773 A1 * | 2/2009 | Pandya et al. | 320/108 |
| 2009/0072629 A1 | 3/2009 | Cook et al. | |
| 2010/0123452 A1 | 5/2010 | Amano et al. | |
| 2010/0225271 A1 | 9/2010 | Oyobe et al. | |
| 2011/0114400 A1 | 5/2011 | Kanno | |
| 2011/0121778 A1 | 5/2011 | Oyobe et al. | |
| 2012/0032525 A1 | 2/2012 | Oyobe et al. | |

FOREIGN PATENT DOCUMENTS

| | | |
|---|---|---|
| JP | 08-237890 | 9/1996 |
| JP | 2006-230032 | 8/2006 |
| JP | 4453741 | 1/2010 |
| JP | 201 0-1 24522 | 6/2010 |
| JP | 2011-078299 | 4/2011 |
| JP | 2011-109903 | 6/2011 |
| WO | WO 2006/022365 A1 | 3/2006 |

OTHER PUBLICATIONS

Non-Final Office Action U.S. Appl. No. 13/530,892 dated Jul. 20, 2015.

* cited by examiner

*Primary Examiner* — Robert Deberadinis
(74) *Attorney, Agent, or Firm* — McDermott Will & Emery LLP

(57) ABSTRACT

To increase efficiency of wireless power feeding to a moving object in wireless power feeding. A wireless power feeder 116 feeds power by wireless from a plurality of feeding coils L2 to an EV 108 including a receiving coil L3. The feeding coils L2 are arranged along a moving direction of the EV 108 and receive power from a power supply circuit including a plurality of power transmission control circuits 200. The power supply circuit 102 makes a first feeding coil L2 supply AC power to the EV 108 when the EV 108 passes through the first feeding coil L2 and, at the same time, prepares power feeding from a second feeding coil L2 through which the EV 108 has not passed.

13 Claims, 9 Drawing Sheets

WIRELESS POWER FEEDER, WIRELESS POWER RECEIVER, AND WIRELESS POWER TRANSMISSION SYSTEM

CROSS-REFERENCE TO RELATED APPLICATION

The present application claims priority from provisional patent application No. 61/499,892 filed on Jun. 22, 2011.

BACKGROUND OF THE INVENTION

1. Field of the Invention

The present invention relates to wireless power feeding and, more particularly, to wireless power feeding to a moving object.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range. The type (B) utilizing radio wave is available in a long range; however, it has small electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, high current flows in the receiving coil. At this time, current also flows in the loading coil according to the principle of electromagnetic induction, and power is taken from a load connected in series to the loading coil. By utilizing the magnetic field resonance phenomenon, high power transmission efficiency can be achieved even if the feeding coil and receiving coil are largely spaced from each other (refer to Patent Document 4).

In a case where both or one of the feeding coil and receiving coil are made to form a resonance circuit, a resonance frequency changes depending on a distance between the feeding coil and receiving coil, which in turn changes power transmission efficiency. Even if the resonance frequency has changed, a resonance state can be maintained by adjusting a drive frequency of the feeding coil (see Patent Document 2 and Patent Document 5). Alternatively, a resonance state may be maintained by adjusting an inductance of the feeding coil in a resonance circuit or a capacitance of a capacitor in a resonance circuit (see Patent Document 6), or by adjusting a distance between the exciting coil and feeding coil (see Patent Document 7). The above adjustment methods can be applied in the same way to an electric-field coupling type.

Currently, a plan is being studied in which a receiving coil is buried in a lower portion of an EV (Electric Vehicle) so as to feed power from a feeding coil provided outside the EV in a non-contact manner. Patent Document 8 and Patent Document 9 disclose a technique in which power supplies are connected respectively to a plurality of feeding coils provided on the ground so as to feed power by wireless to a vehicle.

CITATION LIST

Patent Document

[Patent Document 1] U.S. Pat. Appln. Publication No. 2008-0278264

[Patent Document 2] Jpn. Pat. Appln. Laid-Open Publication No. 2006-230032

[Patent Document 3] International Publication No. WO2006-022365

[Patent Document 4] U.S. Pat. Appln. Publication No. 2009-0072629

[Patent Document 5] Jpn. Pat. Appln. Laid-Open Publication No. 2011-78299

[Patent Document 6] Japanese Patent No. 4,453,741

[Patent Document 7] Jpn. Pat. Appln. Laid-Open Publication No. 2010-124522

[Patent Document 8] Jpn. Pat. Appln. Laid-Open Publication No. 2011-109903

[Patent Document 9] Jpn. Pat. Appln. Laid-Open Publication No. 8-237890

It has been pointed that an EV having a charging connector has poor workability in terms of handling of a connector or an electric cable and poses a risk of electrical shock. When wireless power feeding is adopted for the EV, a connector connecting work can be eliminated, and safety can be increased.

Further, when wireless power feeding not only to an EV which is parked but also to a moving EV is assumed, a method can be considered in which power is continuously fed by wireless from a plurality of feeding coils arranged in a moving direction of the EV. In this case, it is necessary to selectively drive one of the plurality of feeding coils that is positioned just below the moving EV.

An object of the present invention is to feed power by wireless to a moving object in a timely manner.

SUMMARY

A wireless power feeder according to the present invention includes: a plurality of feeding coils arranged along a moving direction of the moving object; and a power supply circuit supplying AC power to the plurality of feeding coils. The power supply circuit makes a first feeding coil supply AC power to the moving object when the moving object passes through the first feeding coil and, at the same time, preparing power feeding from a second feeding coil through which the moving object has not passed.

A wireless power receiver according to the present invention is a moving object that receives, at a receiving coil, AC power fed by wireless from a feeding coil. The receiver includes: a receiving coil; a loading coil magnetically coupled to the receiving coil and receiving the AC power that the receiving coil has received from the feeding coil; and a signal transmitting unit transmitting, while the wireless power receiver is receiving power from a first feeding coil of a plurality of feeding coils arranged along a moving direction thereof, a power feeding request signal for requesting power feeding to a second feeding coil located next to the first feeding coil.

A wireless power transmission system according to the present invention includes: a wireless power feeder; and a wireless power receiver formed as the moving object. The wireless power feeder includes a plurality of feeding coils arranged along a moving direction of the moving object and a power supply circuit supplying AC power to the plurality of feeding coils. The wireless power receiver includes a receiving coil and a loading coil magnetically coupled to the receiving coil and receiving the AC power that the receiving coil has received from the feeding coil. The power supply circuit of the wireless power feeder makes a first feeding coil supply AC power to the moving object when the moving object passes through the first feeding coil and, at the same time, prepares power feeding from a second feeding coil through which the moving object has not passed.

According to the present invention, wireless power feeding to a moving object can be performed in an efficient manner.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Figure 1:
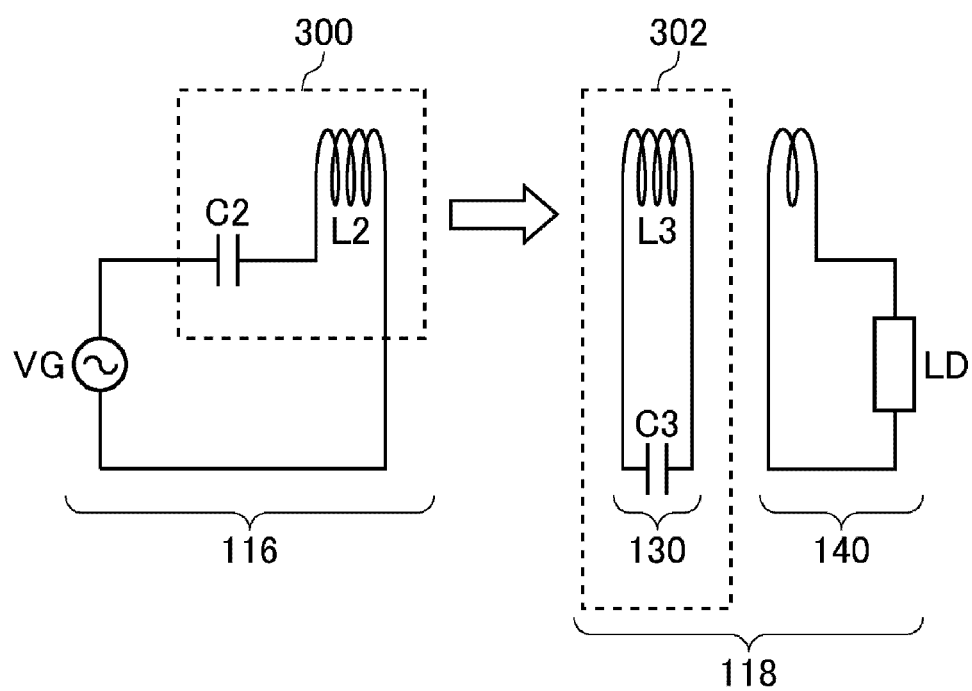
FIG. 1 is a view illustrating an operation principle of a wireless power transmission system in a first embodiment.

Preferred embodiments of the present invention will be described with reference to the accompanying drawings.
[First Embodiment]
As described later using FIGS. 6 to 8, a wireless power feeder 120 in a first embodiment includes a plurality of feeding coils L2 and one power supply circuit 122. The power supply circuit 122 includes a plurality of power transmission control circuits 200.

Firstly, before description of an actual circuit configuration, a basic operation principle of wireless power feeding in a wireless power feeder 116 having a simple configuration including one feeding coil L2 and one power supply circuit 122 (power transmission control circuit 200) will be described with reference to FIGS. 1 and 2.

Secondly, a method for feeding power by wireless to a moving wireless power receiver 118 which is taken by a wireless power feeder 116 including a plurality of feeding coils L2 and one power supply circuit 122 (power transmission control circuit 200) will be described with reference to FIGS. 3 and 4.

Thirdly, operation of a wireless power transmission system 100 in the first embodiment having a wireless power feeder 120 including a plurality of feeding coils L2 and one power supply circuit 122 (plurality of power transmission control circuits 200) will be described with reference to FIG. 5 and subsequent figures.

FIG. 1 is a view illustrating operation principle of a wireless power transmission system 100 in a first embodiment. A wireless power transmission system 100 according to the first embodiment includes a wireless power feeder 116 and a wireless power receiver 118. The wireless power feeder 116 includes a power feeding LC resonance circuit 300. The wireless power receiver 118 includes a receiving coil circuit 130 and a load circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, feeding coil L2, capacitor C3, and receiving coil L3 are set such that the resonance frequencies of the power feeding LC resonance circuit 300 and power receiving LC resonance circuit 302 coincide with each other in a state where the feeding coil L2 and receiving coil L3 are disposed away from each other far enough to ignore the magnetic field coupling therebetween. This common resonance frequency is assumed to be fr0.

In a state where the feeding coil L2 and receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 116 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the feeding coil L2 generates an AC magnetic field of the resonance frequency fr1. The power receiving LC resonance circuit 302 constituting a part of the new resonance circuit also resonates by receiving the AC magnetic field. When the power feeding LC resonance circuit 300 and power receiving LC resonance circuit 302 resonate at the same resonance frequency fr1, wireless power feeding from the feeding coil L2 to receiving coil L3 is performed with the maximum power transmission efficiency. Received power is taken from a load LD of the wireless power receiver 118 as output power. Note that the new resonance circuit can resonate not only at the resonance point 1 (resonance frequency fr1) but also at a resonance point 2 (resonance frequency fr2).

Figure 2:
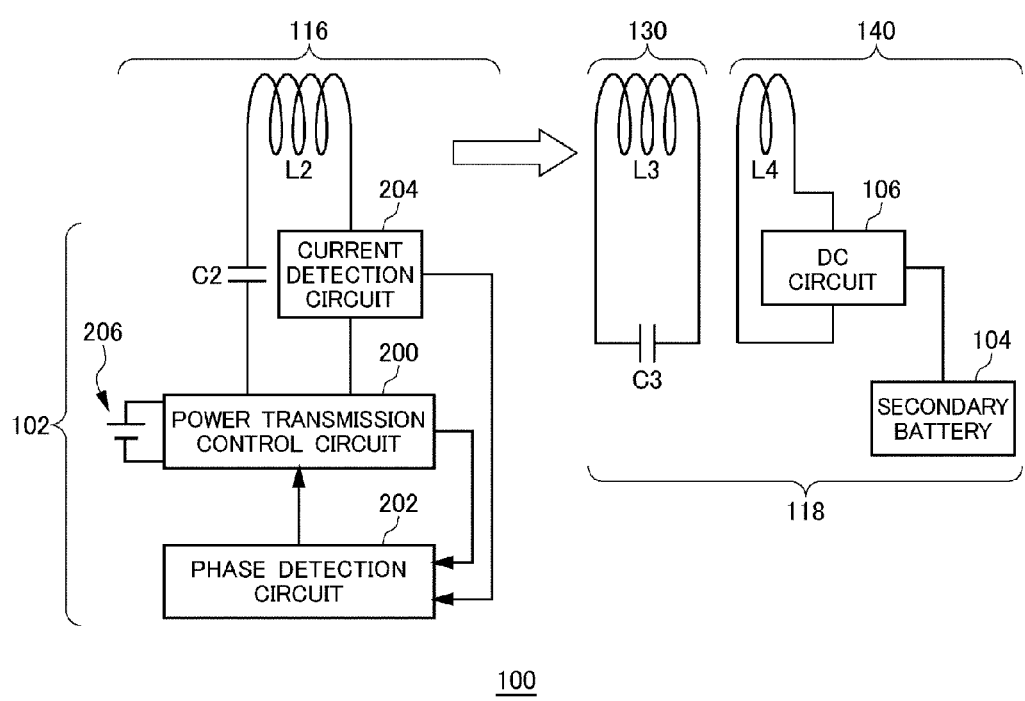
FIG. 2 is an exemplary view illustrating the wireless power transmission system in the first embodiment.

FIG. 2 is a schematic diagram of the wireless power transmission system 100 in the first embodiment. A power transmission control circuit 200 includes a VCO (Voltage Controlled Oscillator) 202 and generates AC current of a drive frequency fo from a DC power supply 206. A current detection circuit 204 measures a phase of the AC current flowing in the feeding coil L2. A phase detection circuit 202 compares a phase of voltage V0 generated by the power transmission control circuit 200 and current phase detected by the current detection circuit 204. When the drive frequency fo coincides with the resonance frequency fr1, the current phase and voltage phase also coincide with each other. The power transmission control circuit 200 detects a deviation (phase difference) between the current phase and voltage phase to thereby detect a deviation between the drive frequency fo and resonance frequency fr1 and adjusts the drive frequency fo so as to eliminate the frequency deviation. With the above configuration, the wireless power feeder 116 makes the drive frequency fo to track the resonance frequency fr1. In this manner, AC power of the resonance frequency fr1 is fed by wireless from the feeding coil L2 to receiving coil L3.

The current detection circuit 204, DC power supply 206, power transmission control circuit 200, and phase detection circuit 202 are collectively referred to as "power supply circuit 102". An adjustment method of the drive frequency fo taken by the power supply circuit 102 can be realized by application of an existing technique as described in detail in, e.g., Patent Document 5.

The wireless power receiver 118 includes a receiving coil circuit 130 and a load circuit 140. In the receiving coil circuit 130, the receiving coil L3 and capacitor C3 constitute a receiving LC resonance circuit 302. AC power received by the receiving coil circuit 130 is further supplied to the load circuit 140.

The load circuit 140 is connected to a DC circuit 106. Received AC power is rectified and smoothened into DC power by the DC circuit 106. A secondary battery 104 is charged with this DC power. The DC circuit 106 and secondary battery 104 correspond to a load LD in FIG. 1.

Figure 3:
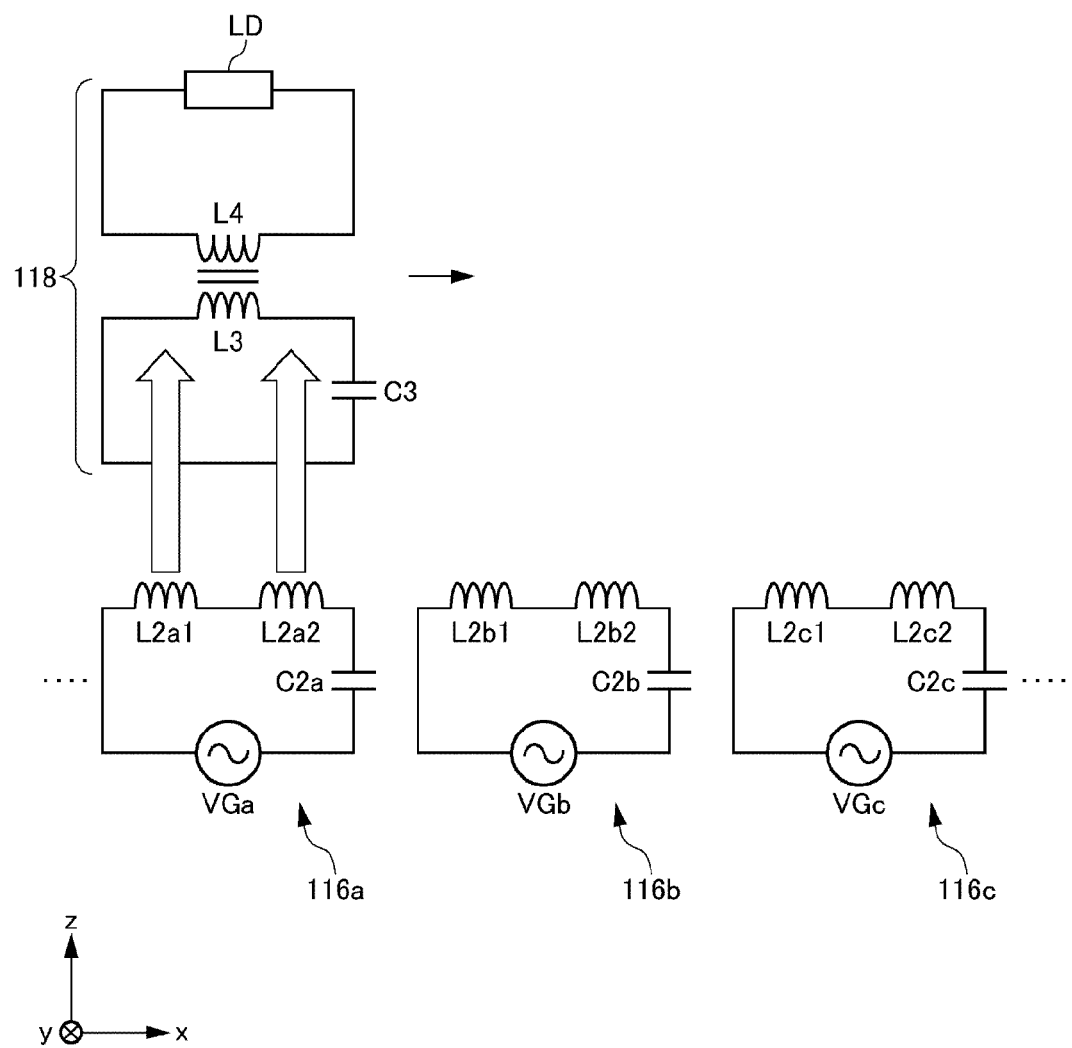
FIG. 3 is a view for explaining a method of feeding power to a moving wireless power receiver.

FIG. 3 is a view for explaining a method of feeding power to the wireless power receiver 118 which is moving. A plurality of wireless power feeders 116*a*, 116*b*, 116*c*, . . . , are buried in a passage such as road or rail. In each wireless power feeder 116, a plurality of the feeding coils L2 may be connected in series to one capacitor C2. In FIG. 3, the wireless power feeder 116*a* includes feeding coils L2*a*1 and L2*a*2 and a capacitor C2*a*, wireless power feeder 116*b* includes feeding coils L2*b*1 and L2*b*2 and a capacitor C2*b*, and wireless power feeder 116*c* includes feeding coils L2*c*1 and L2*c*2 and a capacitor C2*c*.

A power feeding source VGa of the wireless power feeder 116*a* supplies AC power to the two feeding coils L2*a*1 and L2*a*2. Then, the AC power is supplied from the feeding coils L2*a*1 and L2*a*2 to the receiving coil L3 and, finally, to the load LD (DC circuit 106 and secondary battery 104) of the wireless power receiver 118. In the wireless power feeder 116*b*, AC power is supplied from a power feeding source VGb. Similarly, in the wireless power feeder 116*c*, AC power is supplied from a power feeding source VGc.

The wireless power receiver 118 is mounted on a moving object such as a vehicle (EV) or an electric train. The wireless power feeders 116 are arranged in a moving direction (x-direction) of the wireless power receiver 118. When the wireless power receiver 118 is positioned just above the wireless power feeder 116*a*, the wireless power receiver 118 receives power from the feeding coils L2*a*1 and L2*a*2. When the wireless power receiver 118 moves and reaches a position just above the wireless power feeder 116*b*, the wireless power receiver 118 receives power from the feeding coils L2*b*1 and L2*b*2. With such a configuration, the moving object having the wireless power receiver 118 continuously receives power from any of the plurality of wireless power feeders 116 while moving.

Figure 4:
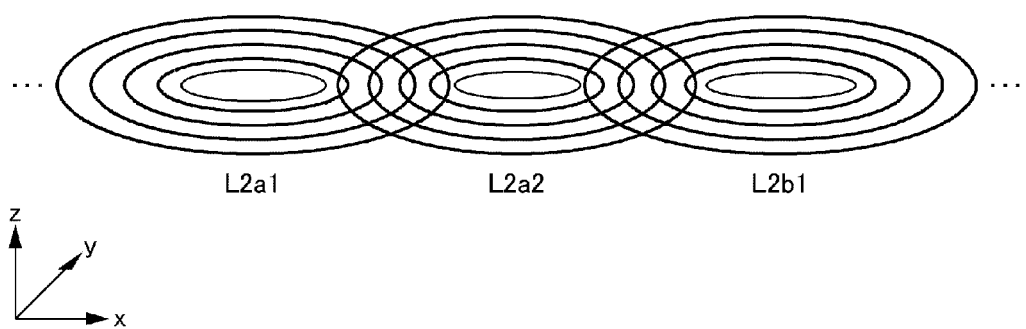
FIG. 4 is a view for explaining an overlapping structure of feeding coils.

FIG. 4 is a view illustrating an overlapping structure of the feeding coils L2. The two feeding coils L2*a*1 and L2*a*2 are adjacently arranged such that coil surfaces thereof partly overlap each other. Similarly, the feeding coil L2*a*2 and feeding coil L2*b*1 arranged adjacent to the feeding coil L2*a*2 are arranged such that coil surfaces thereof partly overlap each other. That is, in x-direction (moving direction), the plurality of feeding coils L2 are tightly arranged so as to partly overlap each other. Thus, the wireless power receiver 118 can continuously and stably receive power while moving. For example, when a wound coil such as a spiral, loop, or solenoid coil is used as the feeding coil L2, it is preferable to make the adjacent feeding coils L2 overlap each other in a range of 0 to coil winding width (winding width in x-direction) of the feeding coil L2. In this case, it is possible to increase an area where power can continuously and stably be fed to the wireless power receiver 118. It is more preferable to make the adjacent feeding coils L2 overlap each other in a range of 1×winding width to ½×winding width. In this case, it is possible to suppress a reduction in the charge efficiency of the wireless power receiver 118 in the overlapping area of the feeding coils L2. The plurality of feeding coils L2 preferably have the same coil area but need not have the same shape.

Figure 5:
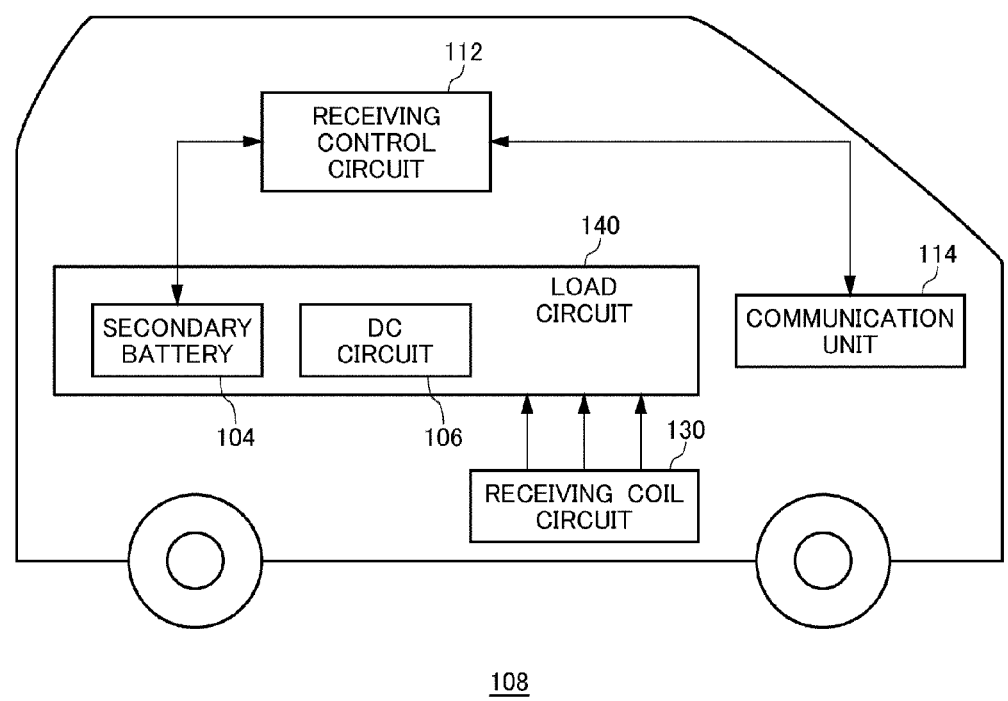
FIG. 5 is a functional block diagram of an EV having the wireless power receiver.

FIG. 5 is a functional block diagram of an EV 108 having the wireless power receiver 118. The EV 108 includes a receiving coil circuit 130, a load circuit 140, a receiving control circuit 112, and a communication unit 114. The receiving coil circuit 130 is installed at a lower position of the EV 108 and receives AC power from the wireless power feeder 116 buried in the ground. The received AC power is converted by the DC circuit 106 into DC power, which is used to charge the secondary battery 104.

The receiving control circuit 112 monitors a charging state of the secondary battery 104 and controls various circuits such as the communication unit 114. The communication unit 114 (signal transmitting unit) communicates with the wireless power feeder 116. Details of functions of the receiving control circuit 112 and communication unit 114 will be described later.

Figure 6:
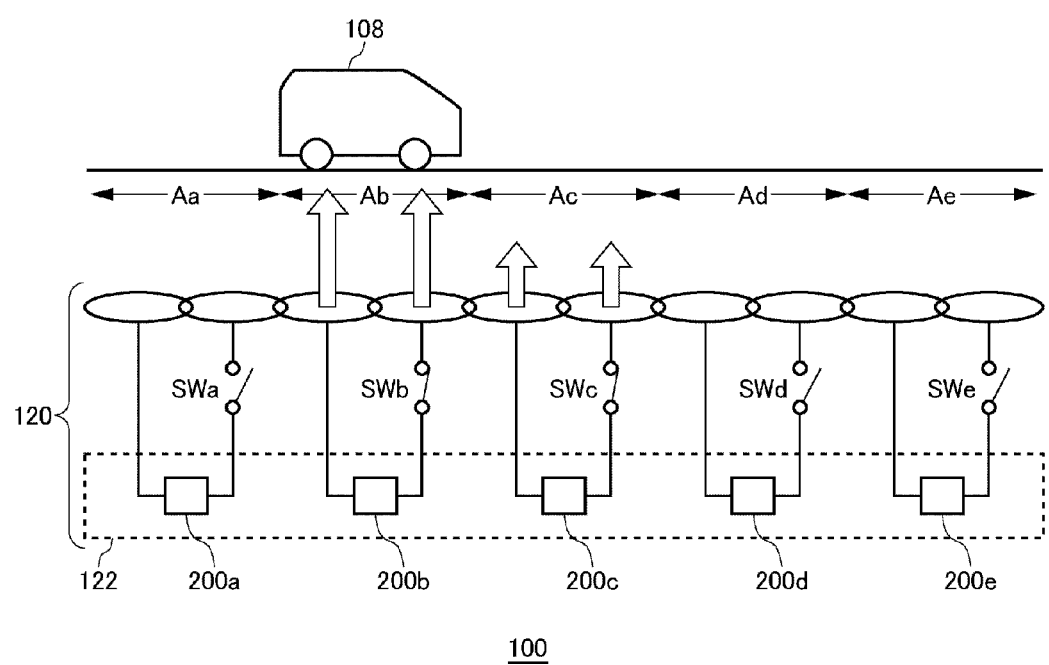
FIG. 6 is a view illustrating a basic configuration of the wireless power transmission system in the first embodiment.

FIG. 6 is a view illustrating a basic configuration of the wireless power transmission system 100 in the first embodiment. Here, a description is given of an outline of operation of the wireless power transmission system 100 in the first embodiment, and a concrete control method will be described later using FIGS. 7 and 8. Actually, the wireless power feeder 120 has a configuration obtained by combining the plurality of wireless power feeders 116 illustrated in FIG. 3.

The wireless power feeder 120 is buried in the ground and includes the plurality of feeding coils L2 and plurality of power transmission control circuits 200. In FIG. 6, one power transmission control circuit 200 is assigned to two feeding coils L2. The power supply circuit 122 of the wireless power feeder 120 includes a plurality of power transmission control circuits 200*a* to 200*e*. The feeding coils L2 are arranged along the moving direction of the EV 108, that is, along a road. The power transmission control circuit 200*a* supplies power to the two feeding coils L2 through a switch SWa. Similarly, the power transmission control circuits 200*b* to 200*e* supply power to their respectively corresponding two feeding coils L2 through switches SWb to SWe, respectively.

The wireless power feeder 120 aims to feed power by wireless to the EV 108 which is moving, and it is not efficient to use all the feeding coils L2 to feed power to the moving EV 108. Therefore, the switches SWa to SWe are selectively turned ON/OFF so as to allow the feeding coils L2 just below the EV 108 to feed power and to keep the remaining feeding coils L2 from feeding power.

The EV 108 of FIG. 6 is passing through an area Ab. Since a power transmission control circuit that supplies power to the feeding coils L2 just below the area Ab is the power transmission control circuit 200b, the switch SWb needs to be turned ON. In FIG. 6, not only the switch SWb, but also the switch SWc has been turned ON. This is for the power transmission control circuit 200c corresponding to an area Ac to prepare power feeding since it can be expected that the EV 108 currently existing area Ab immediately enters the area Ac.

It takes a little time from when the switch SWc is turned ON to connect the power transmission control circuit 200c and feeding coils L2 to when sufficient AC power is actually fed from the feeding coils L2 in the area Ac. Therefore, the power transmission control circuit 200c prepares power feeding before the EV 108 enters the area Ac so as not to cause a delay in power feeding. In particular, in a case where the EV 108 moves at high-speed, early preparation of power feeding is required.

The preparation of power feeding mentioned here may be turning ON of the switch SWc to actually start wireless power feeding or may be starting wireless power feeding with AC power less than usual. In this case, control may be performed so as to achieve a rated output (large output) at a time when the EV 108 actually passes through the area Ac. Alternatively, control may be performed in which the switch SWc is not turned ON but the drive frequency fo is adjusted according to a power feeding condition described later. Further alternatively, an inductance of the feeding coil L2 or a capacitance of the capacitor C3 may be adjusted according to the feeding conditions. At any rate, it is only necessary in the preparation of power feeding to cause transition from a non-power feeding state to a power-feeding state or to perform various setting for the transition. Hereinafter, two control methods: "detection type" and "communication type" will be described in detail with reference to FIGS. 7 and 8.

Figure 7:
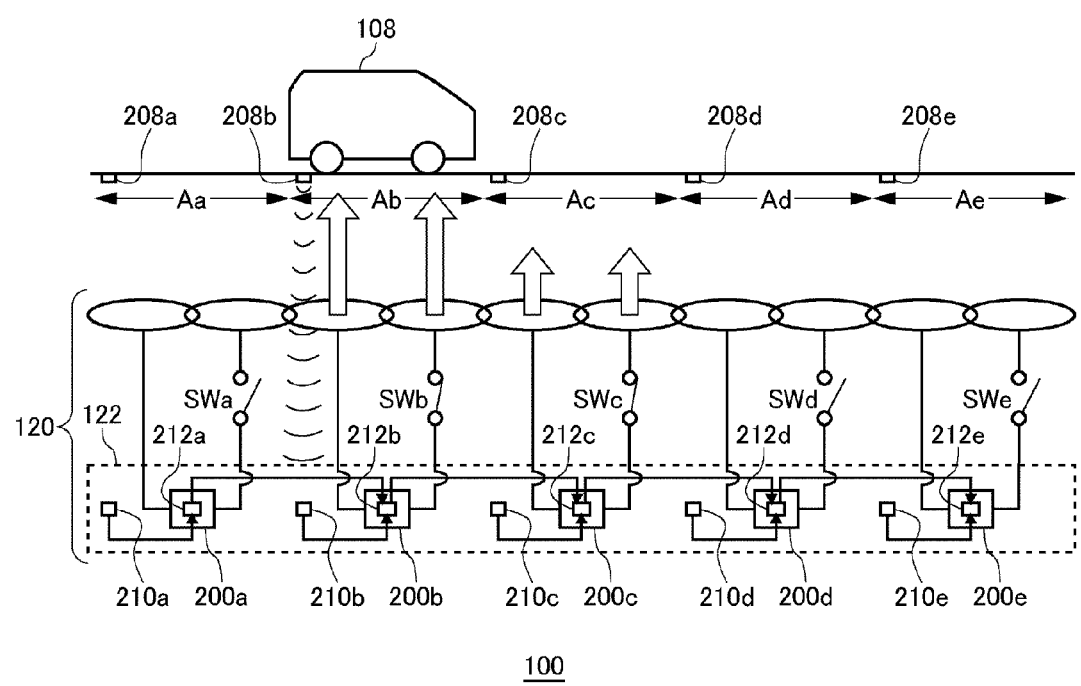
FIG. 7 is a configuration view of the wireless power transmission system of a detection type.

FIG. 7 is a configuration view of the wireless power transmission system 100 of the detection type. In the detection type, a plurality of sensors 208a to 208e buried in the ground detect a position of the EV 108, and the plurality of switches SWa to SWe are controlled based on the detection signals.

In the wireless power feeder 120 of the detection type, a receiver (signal receiving unit) 210 is provided for each power transmission control circuit 200. The power transmission control circuit 200 has a communication unit 212 for communicating with another power transmission control circuit 200.

The sensors 208a to 208e are each a typical sensor such as an optical sensor and configured to detect passage of the EV 108. The sensors 208a to 208e correspond to the areas Aa to Ae, respectively. The sensor 208a transmits a first detection signal upon detecting passage of the EV 108, and the corresponding receiver 210a receives the first detection signal. Upon receiving the first detection signal, the receiver 210a transmits a second detection signal to the communication unit 212a of the corresponding power transmission control circuit 200a. Upon receiving the second detection signal, the power transmission control circuit 200a turns ON the switch SWa. As a result, power feeding in the area Aa is executed. The same operation is performed in other areas Ab to Ae.

In FIG. 7, the sensor 208b is detecting passage of the EV 108, so that the switch SWb is tuned ON to execute power feeding in the area Ab. The receiver 210b that has received the first detection signal from the sensor 208b transmits the second detection signal to the communication unit 212b, and the communication unit 212b transmits a power feeding request signal to the next communication unit 212c. Upon receiving the power feeding request signal, the power transmission control circuit 200c enters a power feeding standby state.

During power feeding made by the power transmission control circuit 200b, not only the power transmission control circuit 200c but also the next power transmission control circuit 200d may be made to enter the power feeding standby state. In this case, the communication unit 212c may transmit the power feeding request signal also to the communication unit 212d. Alternatively, the communication unit 212b may transmit the power feeding request signal to both the communication units 212c and 212d.

The number of the power transmission control circuits 200 to be made to enter the power feeding standby state may be changed in accordance with a moving speed of the EV 108. In this case, for example, the sensor 208b detects not only the position of the EV 108 but also the moving speed thereof. When the detected speed is equal to or higher than a predetermined speed, the power transmission control circuits 200c and 200d are made to enter the power feeding standby state, and when the detected speed is lower than the predetermined speed, only the power transmission control circuits 200c is made to enter the power feeding standby state. In other words, the area A to be set at power feeding standby state may be specified as area A through which the EV 108 is estimated to pass within a predetermined time. This is because when the EV 108 moves at high speed, the power feeding may be delayed if the power transmission control circuit 200d located next to the power transmission control circuit 200c is not made to enter the power feeding standby state. According to such a control method, power can be fed to the moving EV 108 in a more timely manner.

The power transmission control circuit 200 may transmit a power feeding condition to the next power transmission control circuit 200 in addition to or in place of the power feeding request signal. The resonance frequency fr1 of the feeding coil L2 and receiving coil L3 changes depending on weather conditions, vehicle height, vehicle type, and the like. To increase power transmission efficiency, it is preferable to make the drive frequency fo of the power transmission control circuit 200 to coincide with the resonance frequency fr1. Thus, the power transmission control circuit 200a adjusts the drive frequency fo while executing wireless power feeding and transmits a result of the adjustment to the power transmission control circuit 200b as the power feeding condition, which allows the power transmission control circuit 200b to set an adequate drive frequency fo before starting actual power feeding. The power transmission control circuit 200b further adjusts the drive frequency fo while executing wireless power feeding using the drive frequency fo set before the start of power feeding as an initial value and transmits a result of the adjustment to the power transmission control circuit 200c as the power feeding condition. The power feeding condition may be transmitted in a similar manner to the power transmission control circuit 200c and subsequent power transmission control circuit 200d. The power transmission control circuits 200b, 200c, and 200d may execute wireless power feeding at the drive frequency fo set before the start of power feeding. That is, the power transmission control circuit 200 may execute wireless power feeding according to the power feeding condition set before the start of power feeding.

Figure 8:
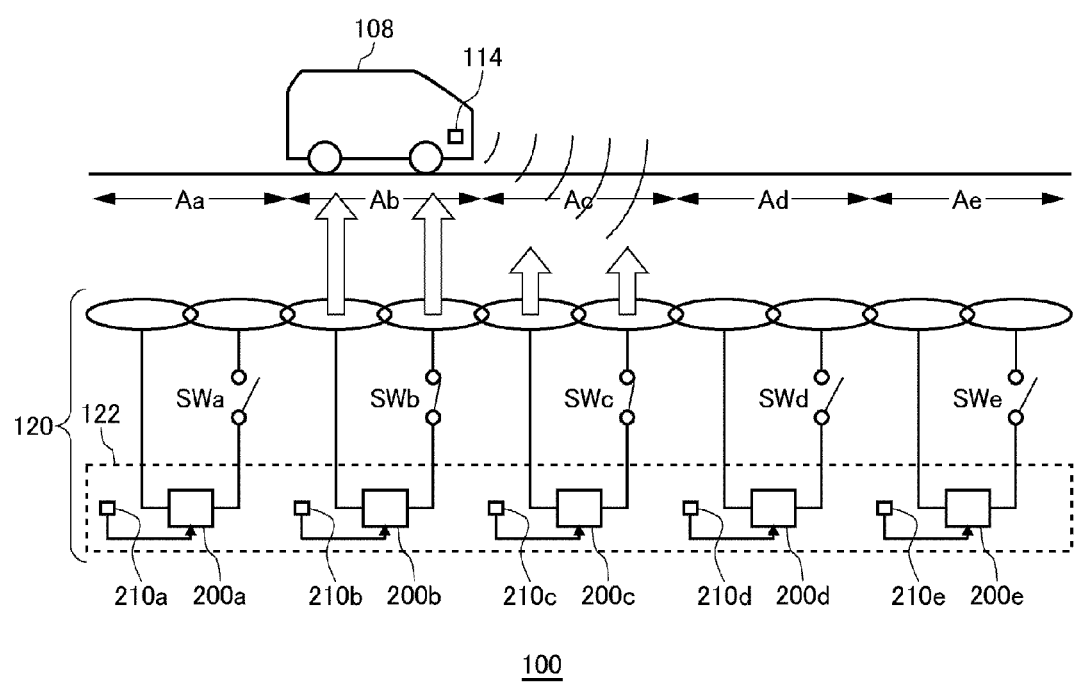
FIG. 8 is a configuration view of the wireless power transmission system of a communication type.

FIG. 8 is a configuration view of the wireless power transmission system 100 of the communication type. In the communication type, the receiver 210 receives the power feeding request signal that the communication unit 114 of the EV 108 transmits. The switches SWa to SWe are controlled based on the power feeding request signal.

Also in the wireless power feeder 120 of the communication type, the receiver (signal receiving unit) 210 is provided for each power transmission control circuit 200. The EV 108 continuously or periodically transmits the power feeding request signal from the communication unit (signal transmitting unit) 114. Upon receiving the power feeding request signal, the receiver 210a transfers the power transmission request signal to the power transmission control circuit 200a to cause the power transmission control circuit 200a to enter the power feeding standby state. The power transmission control circuit 200a starts full-scale wireless power feeding after elapse of a predetermined time from or immediately after the transition to the power feeding standby state. The same operation is performed in other areas Ab to Ae.

In FIG. 8, the EV 108 is receiving power from the area Ab. In this state, the receiver 201c newly receives the power feeding request signal to cause the power transmission control circuit 200c to enter the power feeding standby state.

As in the case of the detection type, not only the power transmission control circuit 200c but also the next power transmission control circuit 200d may be made to enter the power feeding standby state during power feeding made in the area Ab. In this case, the communication unit 114 of the EV 108 may transmit the power feeding request signal with an output large enough to allow not only the receiver 210c but also the next receiver 210d to receive the power feeding request signal.

The number of the power transmission control circuits 200 to be made to enter the power feeding standby state may be changed in accordance with the moving speed of the EV 108. For example, the receiving control circuit 112 of the EV 108 may change an output of the communication unit 114 in accordance with the moving speed. That is, when the moving speed of the EV 108 is equal to or higher than a predetermined speed, the communication unit 114 transmits the power feeding request signal with an output large enough to allow not only the receiver 210c but also the receiver 210d to receive the power feeding request signal to cause both the power transmission control circuits 200c and 200d to enter the power feeding standby state, and when the moving speed of the EV 108 is lower than the predetermined speed, the communication unit 114 reduces the output level of the power feeding request signal to cause only the power transmission control circuit 200c to enter the power feeding standby state. In other words, the number of the power transmission control circuits 200 to be made to enter the power feeding standby state may be determined depending on the number of the areas Aa to Ae through which the EV 108 is estimated to pass within a predetermined time. According to such a control method, power can be fed to the moving EV 108 in a more timely manner. The communication unit 114 may transmit the power feeding condition in addition to the power feeding request signal. In this case, the receiver 210 receives the power feeding condition, and the power transmission control circuit 200 may execute wireless power feeding according to the specified power feeding condition.

In either the communication type or detection type, the receiving control circuit 112 may stop transmission of the power feeding request signal from the communication unit 114 when a charging rate of the secondary battery 104 is equal to or higher than a predetermined value. Alternatively, the receiving control circuit 112 may make the communication unit 114 transmit a power feeding stop signal. When the receiver 210 receives the power feeding stop signal, the power transmission control circuit 200 does not enter the power feeding standby state. According to such a control method, power feeding can be prevented from being unnecessarily performed when the secondary battery 104 is sufficiently charged.

[Second Embodiment]

Figure 9:
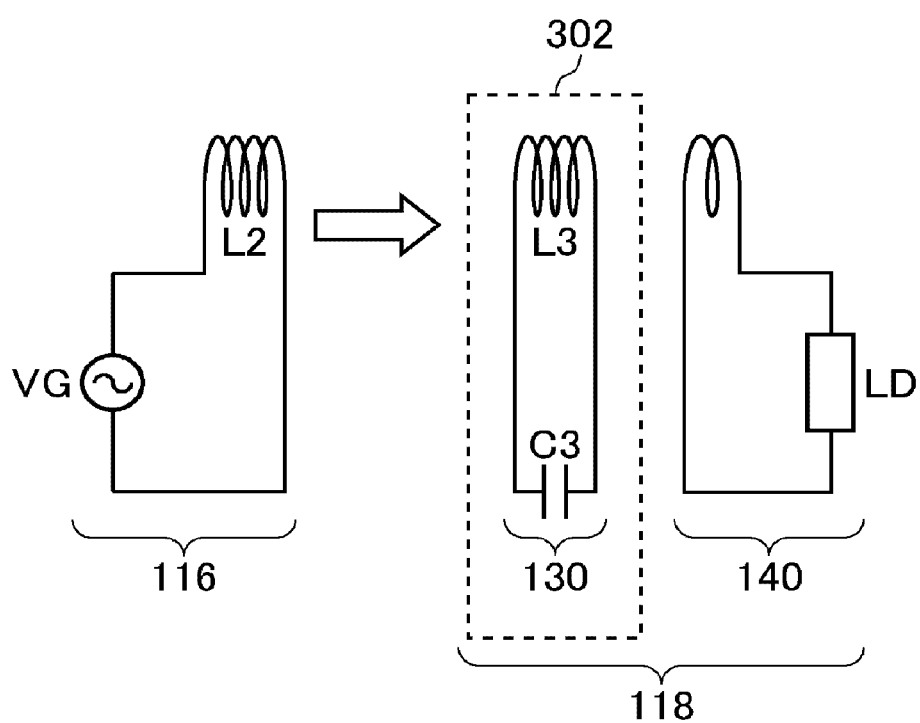
FIG. 9 is a view illustrating an operation principle of a wireless power transmission system in a second embodiment.

FIG. 9 is a view illustrating operation principle of the wireless power transmission system 100 according to a second embodiment. The wireless power transmission system 100 according to the second embodiment includes the wireless power feeder 116 and wireless power receiver 118. However, although the wireless power receiver 118 includes the power receiving LC resonance circuit 302, the wireless power feeder 116 does not include the power feeding LC resonance circuit 300. That is, the power feeding coil L2 does not constitute a part of the LC resonance circuit. More specifically, the power feeding coil L2 does not form any resonance circuit with other circuit elements included in the wireless power feeder 116. No capacitor is connected in series or in parallel to the power feeding coil L2. Thus, the power feeding coil L2 does not resonate in a frequency at which power transmission is performed.

The power feeding source VG supplies AC current of the resonance frequency fr1 to the power feeding coil L2. The power feeding coil L2 does not resonate but generates an AC magnetic field of the resonance frequency fr1. The power receiving LC resonance circuit 302 resonates by receiving the AC magnetic field. As a result, large AC current flows in the power receiving LC resonance circuit 302. Studies have revealed that formation of the LC resonance circuit is not essential in the wireless power feeder 116. The feeding coil L2 does not constitute the power feeding LC resonance circuit, so that the wireless power feeder 116 does not enter the resonance state at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the power feeding coil L2 and power receiving coil L3 are magnetic-field-coupled to each other, a new resonance circuit (new resonance circuit formed by coupling of resonance circuits) is not formed due to absence of the capacitor C2. In this case, the stronger the magnetic field coupling between the power feeding coil L2 and power receiving coil L3, the greater the influence exerted on the resonance frequency of the power receiving LC resonance circuit 302. By supplying AC current of this resonance frequency, that is, a frequency near the resonance frequency fr1 to the power feeding coil L2, the wireless power feeding of a magnetic field resonance type can be achieved. In this configuration, the capacitor C2 need not be provided, which is advantageous in terms of size and cost.

A difference between the first and second embodiment is presence or absence of the capacitor C2. Thus, the basic configuration of the second embodiment is basically the same as that of the first embodiment illustrated in FIGS. 2 to 8.

The wireless power transmission system 100 of the present invention has been described based on the embodiments. In all of the above embodiments, power can be fed by wireless to a moving object such as the EV or electric train while it is in motion. The moving object (wireless power receiver 118)

selectively receives power from the feeding coils L2 through which the moving object is passing and, at the same time, the feeding coils L2 through which the moving object will soon pass enter the power feeding standby state, so that even if the moving object moves at high speed, it can receive power continuously. Further, the plurality of feeding coils L2 are arranged such that the coil surfaces thereof partly overlap each other, power can be fed more stably to the moving wireless power receiver 118. Further, one power feeding source VG is associated with the plurality of feeding coils L2, so that the number of the power feeding sources VG can be suppressed even when a large number of the feeding coils L2 need to be arranged. Although one power feeding source VG is used to drive the two feeding coils L2 has been described in the above embodiments, a configuration may be possible in which one power feeding source VG is used to drive three to several tens of the feeding coils L2.

The present invention has been described based on the above embodiments. It should be understood by those skilled in the art that the above embodiments are merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

The "AC power" used in the wireless power transmission system 100 may be transmitted not only as an energy but also as a signal. Even in the case where an analog signal or digital signal is fed by wireless, the wireless power transmission method of the present invention may be used.

Although the "magnetic field resonance type" that utilizes a magnetic field resonance phenomenon has been described in the present embodiments, the magnetic field resonance is not essential in the present invention. For example, the present embodiments can be applied to the above-described type A (for short distance) that utilizes the electromagnetic induction, wherein the feeding coil and receiving coil are electromagnetically coupled (inductively coupled) as in the "magnetic field resonance type".

The present invention can be applied to a wireless power transmission system of a type in which one of two electrodes constituting a capacitor is used as a feeding electrode and the other one thereof is used as a receiving electrode so as to perform wireless power feeding from the feeding electrode to receiving electrode based on a principle of an electric field coupling (electrostatic coupling). More specifically, for example, the present invention can be applied to a wireless power transmission system of an electrostatic induction type that utilizes electrostatic induction generated when the feeding electrode and receiving electrode are brought close to each other or a wireless power transmission system of an electric field coupling type in which a capacitor is made to resonate so as to cause power to be fed by wireless from the feeding electrode to receiving electrode.

What is claimed is:

1. A wireless power feeder that wirelessly feeds power from a feeding coil to a moving object including a receiving coil, comprising:
    a plurality of feeding coils arranged along a moving direction of the moving object; and
    a power supply circuit supplying AC power to the plurality of feeding coils, wherein
    the power supply circuit makes a first feeding coil supply AC power to the moving object when the moving object passes through the first feeding coil and preparing power feeding from a second feeding coil through which the moving object has not passed,
    the power supply circuit includes a first power transmission control circuit supplying AC power to the first feeding coil and a second power transmission control circuit supplying AC power to the second feeding coil,
    the first power transmission control circuit transmits a power feeding request signal to the second power transmission control circuit when supplying AC power to the first feeding coil,
    the second power transmission control circuit enters a power feeding standby state to prepare power feeding from the second feeding coil when receiving the power feeding request signal,
    the first power transmission control circuit transmits a power feeding condition of the first feeding coil to the second power transmission control circuit, and
    the second power transmission control circuit supplies AC power to the second feeding coil according to the power feeding condition.

2. The wireless power feeder according to claim 1, wherein the second feeding coil is a feeding coil through which the moving object will pass within a predetermined time from when the moving object has passed through the first feeding coil.

3. The wireless power feeder according to claim 2, wherein the power supply circuit selects the second feeding coil based on a current position of the moving object.

4. The wireless power feeder according to claim 1, wherein the plurality of feeding coils are adjacently arranged such that coil surfaces thereof partly overlap each other.

5. The wireless power feeder according to claim 1, further comprising a signal receiving unit receiving a power feeding request signal from the moving object, wherein
    the power supply circuit prepares power feeding from the second feeding coil when the signal receiving unit receives the power feeding request signal.

6. The wireless power feeder according to claim 5, wherein the signal receiving unit receives a power feeding stop signal from the moving object, and
    the power supply circuit stops power feeding from the second feeding coil when the signal receiving unit receives the power feeding stop signal.

7. The wireless power feeder according to claim 1, wherein the power supply circuit further includes third power transmission control circuits respectively supplying AC power to third feeding coils arranged subsequently to the second feeding coil, and
    in addition to the second power transmission control circuit, one or more the third power transmission control circuits are configured to enter the power feeding standby state to prepare power feeding from the corresponding third feeding coils, respectively, in accordance with a moving speed of the moving object.

8. A wireless power receiver which is a moving object that receives, at a receiving coil, AC power wirelessly fed from a feeding coil of a wireless power feeder, comprising:
    a receiving coil;
    a loading coil magnetically coupled to the receiving coil and receiving the AC power that the receiving coil has received from the feeding coil; and
    a signal transmitting unit transmitting, while the wireless power receiver is receiving power from a first feeding coil of a plurality of feeding coils arranged along a moving direction thereof, a power feeding request signal for requesting power feeding to a second feeding coil located next to the first feeding coil, wherein the signal transmitting unit transmits a power feeding condition to the second feeding coil.

9. The wireless power receiver according to claim 8, wherein
the loading coil is connected with a secondary battery, and the secondary battery is charged with the AC power that has been supplied to the loading coil.

10. The wireless power receiver according to claim 9, wherein
the signal transmitting unit does not require the second feeding coil to feed power when a charging ratio of the secondary battery is equal to or higher than a predetermined threshold value.

11. The wireless power receiver according to claim 8, wherein the signal transmitting unit transmits the power feeding request signal for requesting power feeding to the second feeding coil and one or more feeding coils arranged subsequently to the second feeding coil in accordance with a moving speed of the moving object.

12. A wireless power transmission system for wirelessly feeding power from a feeding coil to a moving object including a receiving coil, comprising:
a wireless power feeder; and
a wireless power receiver formed as the moving object, wherein
the wireless power feeder includes a plurality of feeding coils arranged along a moving direction of the moving object and a power supply circuit supplying AC power to the plurality of feeding coils,
the wireless power receiver includes a receiving coil and a loading coil magnetically coupled to the receiving coil and receiving the AC power that the receiving coil has received from the feeding coil,
the power supply circuit makes a first feeding coil supply AC power to the moving object when the moving object passes through the first feeding coil and preparing power feeding from a second feeding coil through which the moving object has not passed,
the power supply circuit includes a first power transmission control circuit supplying AC power to the first feeding coil and a second power transmission control circuit supplying AC power to the second feeding coil,
the first power transmission control circuit transmits the power feeding request signal to the second power transmission control circuit when supplying AC power to the first feeding coil,
the second power transmission control circuit enters a power feeding standby state to prepare power feeding from the second feeding coil when receiving the power feeding request signal,
the first power transmission control circuit transmits a power feeding condition of the first feeding coil to the second power transmission control circuit, and
the second power transmission control circuit supplies AC power to the second feeding coil according to the power feeding condition.

13. The wireless power transmission system according to claim 12, wherein
the power supply circuit further includes third power transmission control circuits respectively supplying AC power to third feeding coils arranged subsequently to the second feeding coil, and
in addition to the second power transmission control circuit, one or more the third power transmission control circuits are configured to enter the power feeding standby state to prepare power feeding from the corresponding third feeding coils, respectively, in accordance with a moving speed of the moving object.

* * * * *